United States Patent [19]

Padden

[11] 3,958,628
[45] May 25, 1976

[54] VERTICAL BLOWER COIL UNIT FOR HEATING AND COOLING

[76] Inventor: William R. Padden, 13823 Heritage Drive, Riverview, Mich. 48192

[22] Filed: Mar. 19, 1975

[21] Appl. No.: 559,996

Related U.S. Application Data

[63] Continuation-in-part of Ser. No. 388,898, Aug. 16, 1973, Pat. No. 3,908,752.

[52] U.S. Cl. ................................. 165/35; 165/60; 165/64; 165/103
[51] Int. Cl.² .................. G05D 23/00; F16K 1/16
[58] Field of Search ............... 165/34, 35, 101, 60, 165/64, 29, 103; 251/298

[56] References Cited
UNITED STATES PATENTS

| | | | |
|---|---|---|---|
| 1,816,217 | 7/1931 | Harnett | 165/34 |
| 1,990,895 | 2/1935 | Callahan | 165/35 |
| 2,043,561 | 6/1936 | Sims | 165/16 |
| 2,189,888 | 2/1940 | Endsley | 165/34 |
| 2,231,797 | 2/1941 | Carson | 165/60 |
| 2,816,729 | 12/1957 | Jensen | 251/298 |
| 2,899,803 | 8/1959 | Paley | 62/291 |
| 3,073,296 | 1/1963 | Hollingsworth | 165/35 |
| 3,169,575 | 2/1965 | Engalitcheff | 165/60 |
| 3,625,022 | 12/1971 | Johnson | 165/14 |
| 3,716,097 | 2/1973 | Kelp | 165/101 |

*Primary Examiner*—Charles J. Myhre
*Assistant Examiner*—Daniel J. O'Connor
*Attorney, Agent, or Firm*—Cullen, Settle, Sloman & Cantor

[57] ABSTRACT

A vertical blower coil unit for heating and cooling is provided. The unit includes a pair of parallel vertical passageways one or both of which may have a heat transfer coil means located therein for the passage of cold and hot water therethrough. Inlet damper means are provided to bypass the coil means during times when it is not desired to have air pass thereover for either cooling or heating. A collecting pan is provided beneath the coil means for catching condensate falling from the coil means when cold water is passed therethrough and to act as a water reservoir for humidifying purposes when hot water is passed through the coil means.

8 Claims, 6 Drawing Figures

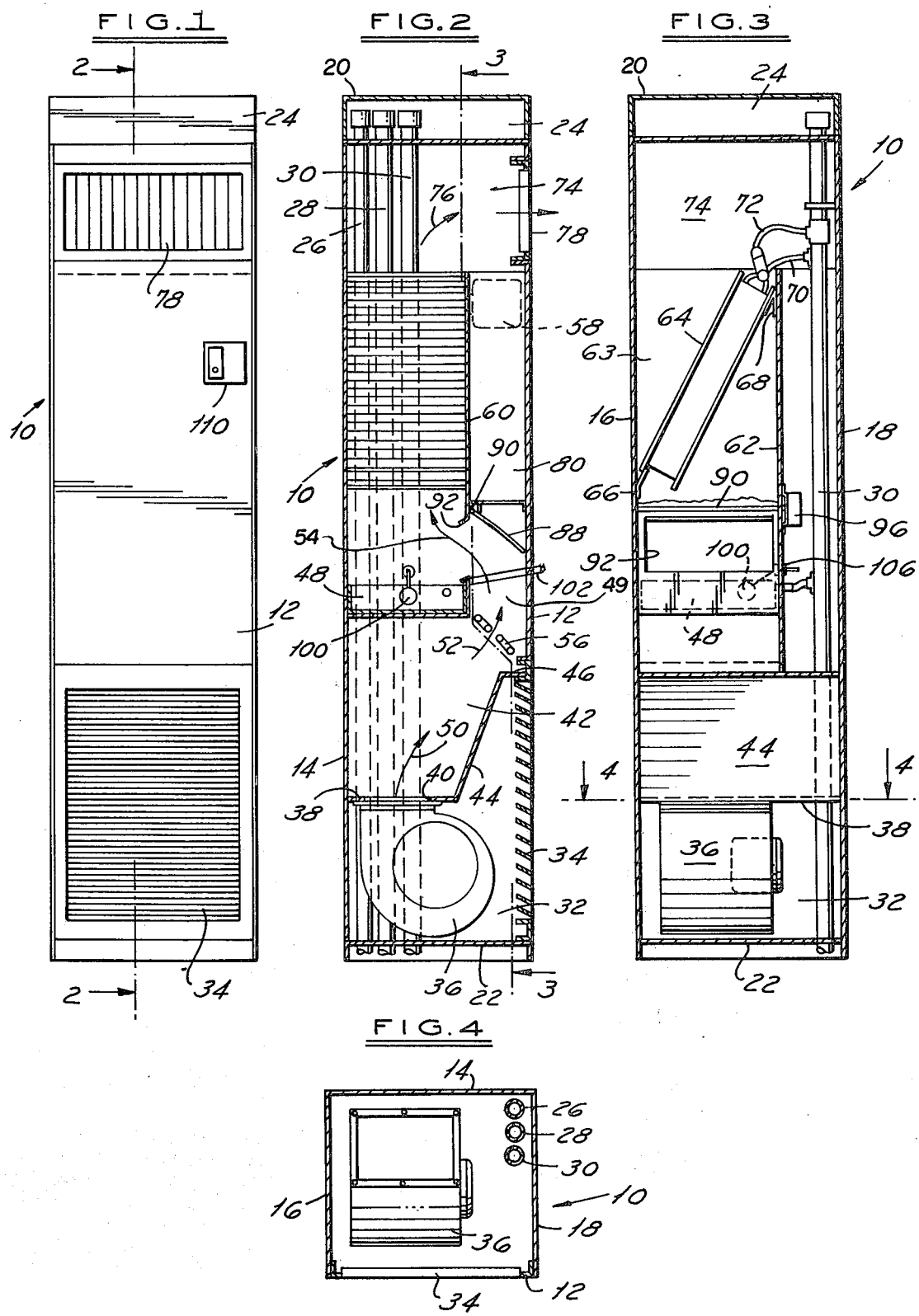

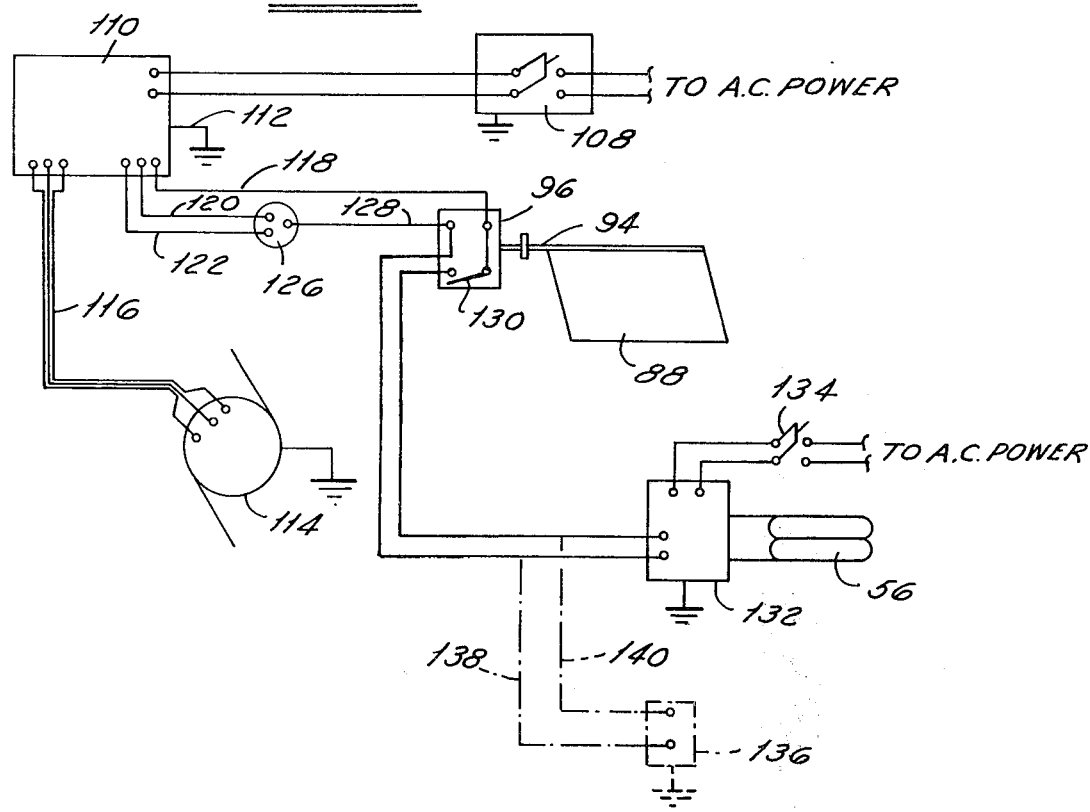
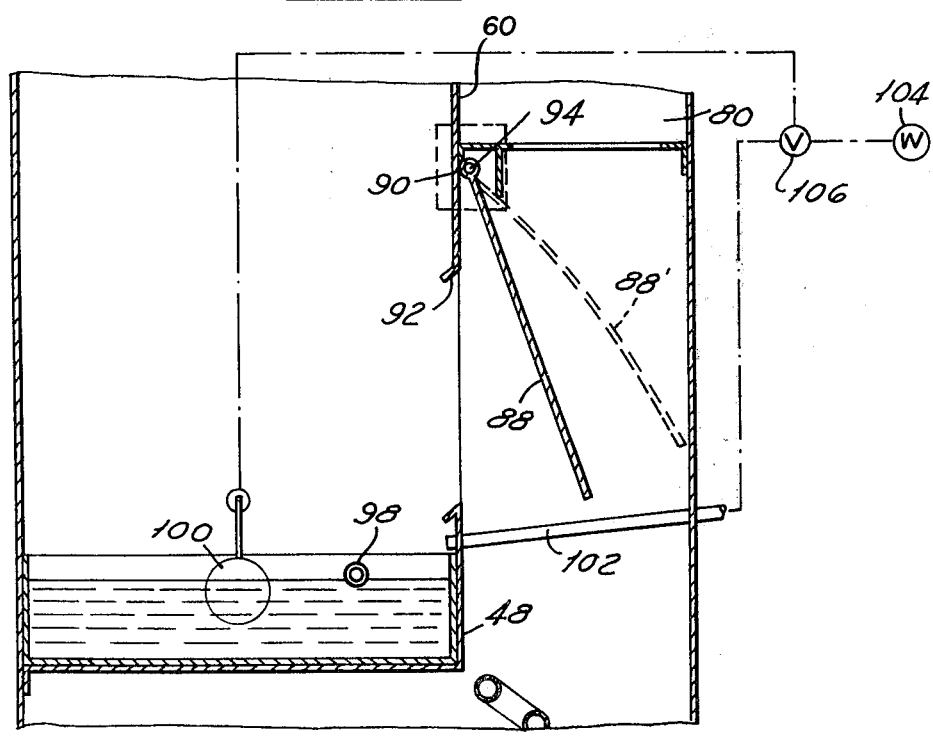

VERTICAL BLOWER COIL UNIT FOR HEATING AND COOLING

RELATED APPLICATION

This application is a continuation in part application of my copending U.S. Pat. application, Ser. No. 388,898, filed Aug. 16, 1973, now U.S. Pat. No. 3,908,752.

BACKGROUND OF THE INVENTION

The present invention relates to a vertical blower coil unit for heating and cooling. Various heat exchange units of the general type or incorporating features similar to those of the present invention have been proposed in the past, for example, in U.S. Pat. Nos. 1,737,040; 2,043,561; 2,139,262; 2,338,382; 2,899,803; 2,984,087; 3,143,864; 3,526,431; 3,625,022; and 3,653,431.

Modern versions of such units as are shown in the older patents and literature are directed towards improved efficiency, quietness, lower cost manufacture, lower cost installation, improved controls and low cost maintenance. The present invention provides such a unit which, from the viewpoint of operation and application, has numerous advantages. In operation, the unit is quiet, it includes minimum mechanical linkage and is adjustable and variable in size. The unit reduces the amount of moving parts as compared to some prior units and also reduces the number of controls required to provide the comfort level of temperature control desired while reducing the cost of installation by allowing factory fabrication of a unit incorporating the necessary piping and wiring.

The unit is designed that the drain pan necessary for catching condensation from the cooling coils is a deep pan with a drainage connection located near the top thereof which allows storage of water for humidifying in the winter months. The water may be supplied to the drain pan either manually by hand or automatically. The unit may operate on either hot water for heating, chilled water for cooling, electrical coils for heating or any combination thereof desired for a particular application.

SUMMARY OF THE INVENTION

A vertical blower coil unit for heating and cooling is provided. The unit comprises a vertically upstanding cabinet having an air inlet in the lower portion thereof and an air outlet in the upper portion thereof. A pair of parallel vertical passageways are provided in the cabinet. Heat transfer coil means for the passage of liquid of preselected temperature are provided in at least one of the passageways. Means are provided to flow cold and hot liquid through the coil means. A blower is provided in the cabinet to circulate air therethrough. Control means are provided to energize the blower in response to temperature requirements of the area being served. A pivotally mounted damper element is provided in the cabinet. The damper element is pivotable to positions blocking one or the other of the vertical passageways while permitting free flow of air through the unblocked passageway. A reversible electric damper motor is connected to the damper element for pivoting the damper element. The control means is operative to energize the damper motor to pivot the damper element to open the vertical passageway in which the heat transfer coil is positioned and block the other vertical passageway. The control means is further operative to energize the damper motor to pivot the damper element to close the vertical passageway in which the heat transfer coil is positioned and open the other vertical passageway to prevent the flow of air over the heat transfer coil means.

In the drawings

FIG. 1 is a front elevational view of the vertical blower coil unit for heating and cooling illustrating the embodiment of the present invention;

FIG. 2 is a vertical sectional view taken substantially along the line 2—2 of FIG. 1 looking in the direction of the arrows;

FIG. 3 is a sectional view taken substantially along the line 3—3 of FIG. 2 looking in the direction of the arrows;

FIG. 4 is a sectional view taken substantially along the line 4—4 of FIG. 3 looking in the direction of the arrows;

FIG. 5 is an enlarged view of the central portion of FIG. 2 illustrating the damper and drain pan construction with the diagrammatic addition of a valving system for automatically supplying water to the drain pan for humidifying purposes; and FIG. 6 is a schematic drawing of the electrical control system utilized in connection with one embodiment of the invention.

Referring to FIGS. 1-4, it will be noted that the vertical blower coil unit for heating and cooling 10 includes an upstanding cabinet structure having a front wall 12, back wall 14, side walls 16, 18, top 20 and bottom wall 22. The front wall is constructed of removable panels to permit access to the interior compartments for maintenance and the like. A compartment 24 is provided at the upper end of the cabinet for the termination point of three riser pipes 26, 28, 30. The compartment 24 provides a skirting near the ceiling of an insulation of the unit 10 to improve the appearance of the cabinet. As will be understood, additional piping may be connected to the upper ends of the risers for servicing of another unit on the floor above the unit illustrated as is conventional.

One compartment 32 is provided in the lower portion of the cabinet. An opening is provided on the front wall 12 of the unit 10 to receive a filter 34 which is removable for replacement purposes and which permits the ingress of air into the compartment 32. A centrifugal blower or a fan 36 is mounted in the compartment 32 on the underside of a partition wall 38 which has an opening 40 therethrough for the passage of air into a second compartment 42. The wall 38 has an upwardly inclined portion 44 which terminates in a horizontal portion 46 and is secured to the front wall 12.

A condensate drain pan 48 is mounted directly above and is spaced vertically from the opening 40. The drain pan 48 terminates well short of the front wall 12 thereby defining a passageway 49 between the front wall 12 and the drain pan 48. Air is thus caused to flow around the drain pan 48 and thence upwardly over the pan 48 as illustrated by arrows 50, 52, 54. The air does not pass directly across the drain pan 48. This is undesirable as the air would then pick up water in the pans and humidify an area being cooled which is undesirable.

An electrical heating coil 56 is illustratively mounted at the mouth of the passageway 49 defined by the front wall 12 and pan 48. The coil 56 is designed as a heating coil used as an auxiliary unit to a possible hot water coil 58 (as shown in phantom lines as a modification of the unit 10) located further upwardly within the unit 10 or it may be used for an insulation wherein only mild low temperatures are ever encountered thereby necessitating only a relatively low energy output heating structure.

Referring to FIGS. 2 and 3, it will be noted that a pair of vertical partitions 60, 62 are provided over the drain pan 48 in general alignment with the sidewalls of the drain pan 48. The partitions 60, 62 define with back wall 14 and sidewall 16 a duct or passageway 63 for the flow of air. A coil structure 64 is mounted within this passageway by means of brackets 66, 68. The coil 64 is designed for the passage of chilled or hot water therethrough for cooling or heating purposes. The coil 64 has an inlet and outlet connected to risers 26, 28 by means of flexible connections 70, 72 (FIG. 3). As will be noted the coil structure is mounted at an angle for more efficient heat exchange with air flowing through the structure or unit 10. One of the risers 26 is an inlet supply line for chilled water while the other riser 28 is an outlet for water exiting from the coil structure 64. Both of the risers 26, 28 are heavily insulated to prevent heat transfer from the water passing therethrough.

A compartment 74 is provided above the coil 64. Air flows as in the direction of arrows 76 from the compartment 74 through an outlet louvre structure 78 into the space to be cooled or heated as the case may be.

A second passageway 80 runs vertically parallel to the passageway 63 in which the cooling coil 64 is mounted. The passageway 80 is a smaller passageway. The physically smaller heating coil 58 may be mounted in passageway 80. The heating coil 58 would be connected to an additional two risers, not shown.

Referring now to FIGS. 2, 3 and 5, it will be noted that a damper construction is provided beneath the coil structure. The damper construction includes a damper element 88 which is pivotally mounted at 90 in the passageway 80. FIG. 2 illustrates the damper element 88 positioned to block airflow through the passageway 80 and permit airflow as shown by the arrows through the passageway 63 occupied by the coil 64. An opening 92 is provided in the partition element 60 for the flow of air as illustrated.

Referring now to FIG. 5, it will be noted that the damper element 88 has been moved to an intermediate position between the dotted line position 88' and a position closing the opening 92. The damper element 88 is fabricated of a flexible material such as a light gauge spring stainless steel so that it may flex as illustrated in FIG. 5 in the dotted line position 88'. This assures positive closing of the passageway 80. Similarly, when the damper element 88 abuts against the partition 60, it will again flex slightly to assure positive closing of the opening 92 and thus close passageway 63.

The damper element 88 is mounted on a rod 94 which is connected to the output shaft of a small electric motor 96 (FIG. 3). The motor 96 is a reversible motor. It is designed so that upon energization thereof in either direction, the output shaft will be driven through only a limited pivot whereupon the motor automatically de-energizes itself. In the illustrated case, the swing may be, for example, 54°. This swing is designed to be greater than the permissible swing of the damper element 88 which may be, for example, in the illustrated case 50°. Consequently, at either end of pivoting of the damper element 88, additional pressure is applied to the element as a consequence of the greater swing of the motor 96 thereby causing the flexing illustrated in FIG. 5 to assure positive closing of the passageway.

FIGS. 2, 3 and 5 also illustrate the structure of the condensate pan 48 which is convertible for use to a humidifying unit which is desired during periods of cold weather. The pan 48 is deeper than the usual pan for collecting condensate so that a reasonably large amount of water may be stored in the pan 48 for the purpose of humidifying. An overflow drain conduit 98 leads from the upper portion of the pan 48 into connection with the drain riser 30. A float valve structure 100 is provided in the pan for actuating an automatic water supply when the water level in the pan falls below a preselected level for humidifying purposes. As will be noted in FIG. 5, a supply conduit 102 is positioned to fill the pan 48 with water. The conduit 102 is for manual fill or is connected to a source of water 104 via a valve 106. The valve 106 is actuated by means of the float 100, the various connections being illustrated diagrammatically. When the float 100 falls below the preselected level, the valve 106 is opened thereby permitting water to flow from source 104 through conduit 102 to the pan 48. When the float 100 rises to a preselected level, the valve 106 is closed thereby discontinuing the flow of water into pan 48. The pan 48 may alternately be filled manually for humidifying purposes through conduit 102.

The control structure for operating the various elements of the unit 10 is illustrated in FIG. 6. Electrical power through the entire system is controlled by means of a manual on-off switch 108 which is connected to AC power as illustrated. AC power is connected to a thermostat 110 via the switch 108. The thermostat 110 is physically illustrated in FIG. 1. The thermostat 110 is grounded at 112. The thermostat is connected to motor 114 of the centrifugal blower via cable 116. The thermostat 110, which is a conventional thermostat, operates to start and stop the motor 114 in accordance with temperature or manual settings made on the thermostat. Such thermostats conventionally operate within a temperature range to avoid continual starting and stopping of the blower or fan 36. For example, the thermostat may energize the fan 36 and damper or the damper motor 96 when the temperature falls one degree below the desired temperature and maintain the energizing until the temperature rises one degree above a desired temperature thus maintaining the desired temperature within a 2° range.

Leads 118, 120, 122 extend from the thermostat 110 to a damper motor 96 which controls actuation of the shaft or rod 94 which drives the damper element 88. Leads 118, 120 are connected to a special thermostat 126 from which a single output lead 128 extends to the damper motor 96. The device 126 is directly attached to the chilled-hot water piping within the unit 10 and is capable of automatically detecting cold or hot water to thereby automatically switch from heating to cooling or cooling to heating as the case may be.

The damper motor 96 also has an automatic end switch 130 which is adapted to connect this structure to a relay structure 132. The relay structure 132 controls the electrical heating coil 56. A second manual switch 134 is provided connected to AC power and to the relay structure 132. Closure of the switch 134 potentially connects the heating coil 56 to a source of electrical power. This becomes an actuality when the relay structure 132 closes the circuit to power. The relay structure 132 is in turn controlled by the damper motor 96 thence to the thermostat 110. An alternative method would be the provision of another relay structure 136 shown in dotted lines which is connected via leads 138, 140 to the relay structure 132. The relay structure 136 controls the flow of hot liquid through the system.

Operation of the unit 10 may now be understood.

Assuming that chilled liquid is being passed through the coil 64 for cooling purposes and when the thermostat 110 senses a rise in temperature sufficient to call for additional cooling effect, the damper element motor 96 is energized to move the damper element 88 to the position illustrated in FIG. 2 blocking passageway 80 and permitting flow of air from the blower 36 through the cooling coil 64. When the air temperature being cooled reaches the preselected point, this is detected by the thermostat 110 which then de-energizes the damper element motor 96 to move the damper element 88 to a position blocking opening 92. This positively stops airflow over the cooling coil, causing air flowing through the unit 10 to pass through the passageway 80 out of contact with the cooling coil 64. Thus, the temperature of the space being cooled is accurately maintained within the desired limits. During a cool day and during the cooling months of the year the electrical auxiliary heater 56 would be energized by relay structure 132 through end switch 130 at the time damper 88 is closed to opening 92.

During the winter months, when the space is heated rather than cooled, the reverse thermostatic action takes place. It will, of course, be appreciated that the electrical heating coil is not controlled in the same fashion. However, such electrical heating is an auxiliary type of heating and, in any event, the electrical coil may be positively controlled.

I claim:

1. An apparatus for heating and cooling comprising a cabinet, an air inlet in the lower portion of the cabinet and an air outlet in the upper portion thereof, a pair of parallel passageways in said cabinet between said air inlet and said air outlet, heat transfer coil means for the passage of liquid of preselected temperature in one of said passageways, means to flow cold or hot liquid therethrough, means for directing a flow of air from said air inlet to said air outlet, a pivotally mounted damper element in said cabinet pivotable to positions blocking one or the other of said passageways while permitting free flow of air through the unblocked passageway, a reversible electric damper motor connected to said damper element for pivoting of same, control means to energize said air flow directing means and said damper motor in response to temperature requirements of the area being served, said control means in response to a first temperature requirement being operative to energize the damper motor to pivot the damper element to a position opening the passageway in which said heat transfer coil means is positioned and block the other passageway, said control means in response to a second temperature requirement being operative to energize the damper motor to pivot the damper element to close the passageway in which the heat transfer coil means is positioned to prevent the flow of air over the heat transfer coil means at that time and open the other passageway to permit the flow of air therethrough to said air outlet, and a relatively deep collecting pan in said one passageway, said pan being being spaced below and located downstream of said heat transfer coil means for collecting condensate falling from said heat transfer coil means when cold liquid is passed therethrough and for use as a water reservoir for humidifying the space between said pan and said heat transfer coil means and the air passing therethrough during periods of time when hot liquid is passed through said heat transfer coil means and said one passageway is open, the air circulated by said air flow directing means when said first passage is opened initially moving through the humidified space between said pan and said heat transfer means where the air is humidified and then across said heat transfer means to said air outlet, means for filling said collecting pan with water during periods of time when water is required for humidifying purposes, said last mentioned means including a float structure in said pan, valve means operated by said float structure, conduit means leading from a source of water supply to said collecting pan, said valve means being located in said conduit means, said float structure being operative to open and close said valve means to maintain the desired level of water in the pan, and an overflow drain conduit carried by said pan and spaced from the bottom thereof, said overflow conduit discharging water from said pan after it reaches a predetermined level.

2. An apparatus as defined in claim 1, further characterized by the provision of second heat transfer coil means in the other of said passageways, one of said heat transfer means being connected to a source of hot liquid and the other of said heat transfer means being connected to a source of cold liquid, said control means being effective to function as defined in Claim 1 with respect to either one of the heat transfer coil means through which cold or hot liquid is being passed at a given time.

3. An apparatus as defined in claim 1, further characterized in the provision of an electric heating coil in the cabinet upstream of said damper element and of said parallel passageways for heating air passing through one or the other of the passageways.

4. An apparatus for heating and cooling comprising a cabinet, an air inlet in the lower portion of the cabinet and an air outlet in the upper portion thereof, a pair of parallel passageways in said cabinet between said air inlet and said air outlet, heat transfer coil means for the passage of liquid of preselected temperature in one of said passageways, means to flow cold or hot liquid therethrough, means for directing a flow of air from said air inlet to said air outlet, a pivotally mounted damper element in said cabinet pivotable to positions blocking one or the other of said passageways while permitting free flow of air through the unblocked passageway, a reversible electric damper motor connected to said damper element for pivoting of same, control means to energize said air flow directing means and said damper motor in response to temperature requirements of the area being served, said control means in response to a first temperature requirement being operative to energize the damper motor to pivot the damper element to a position opening the passageway in which said heat transfer coil means is positioned and block the other passageway, said control means in response to a second temperature requirement being operative to energize the damper motor to pivot the damper element to close the passageway in which the heat transfer coil means is positioned to prevent the flow of air over the heat transfer coil means at that time and open the other passageway to permit the flow of air therethrough to said air outlet, and a relatively deep collecting pan in said one passageway beneath said heat transfer coil means for collecting condensate falling from said heat transfer coil means when cold liquid is passed therethrough and for use as a water reservoir for humidifying air passing through the unit during periods of time when hot liquid is passed through said heat transfer coil means and said one passageway is open, means for filling said collecting pan with water during periods of time when water is required for humidifying purposes, said last mentioned means including a float structure in said pan, valve means operated by said float structure, conduit means leading from a source of water supply to said collecting pan, said valve means being located in said conduit means, said float structure being operative to open and close said valve means to maintain the desired level of water in the pan.

5. An apparatus as defined in claim 4, further characterized in the provision of second heat transfer coil means in the other of said passageways, one of said heat transfer means being connected to a source of hot liquid and the other of said heat transfer means being connected to a source of cold liquid, said control means being effective to function with respect to either one of the heat transfer coil means through which cold or hot liquid is being passed at a given time.

6. An apparatus as defined in claim 4, further characterized in the provision of an electric heating coil in the cabinet upstream of said damper element for heating air passing through one or the other of the passageways.

7. The apparatus as defined in claim 4, further characterized that said passageways are parallel.

8. The apparatus as defined in claim 4, further characterized that said passageways are parallel and are arranged vertically in said cabinet.

* * * * *